J. C. THOMPSON & G. W. HALL.
LUBRICATING DEVICE FOR CAR AXLES.
APPLICATION FILED AUG. 7, 1912.
1,065,641.
Patented June 24, 1913.
2 SHEETS—SHEET 1.
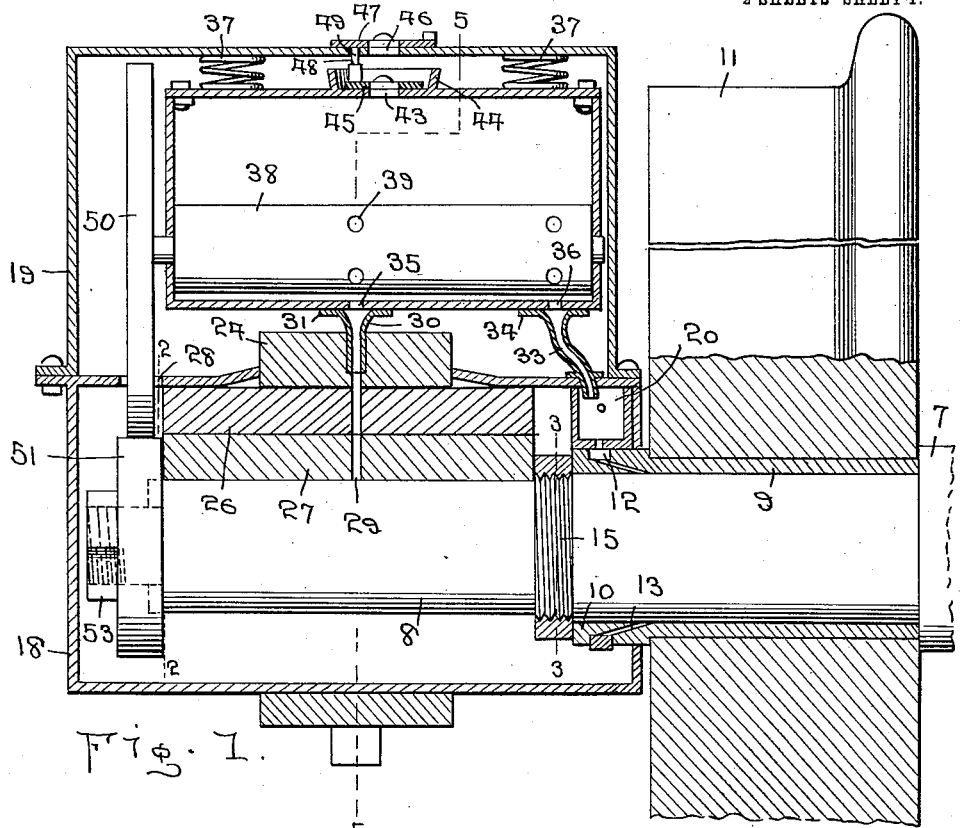
Fig. 1.
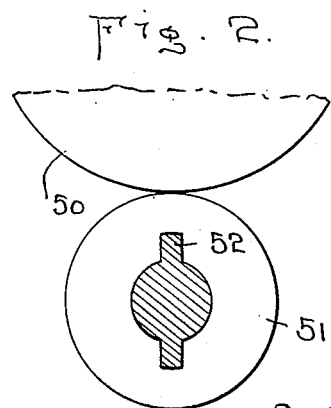
Fig. 2.
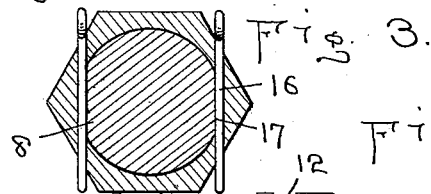
Fig. 3.
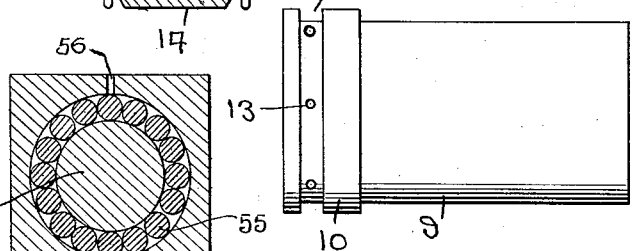
Fig. 4.
Fig. 7.
Witnesses
Thos. Riley
M. Newcomb
Inventors
J. C. Thompson
G. W. Hall and
By W. J. Fitzgerald & Co.
Attorneys J. C. THOMPSON & G. W. HALL.
LUBRICATING DEVICE FOR CAR AXLES.
APPLICATION FILED AUG. 7, 1912.

1,065,641.

Patented June 24, 1913.
2 SHEETS—SHEET 2.

Witnesses
Thos. W. Riley
M. Newcomb

Inventors
J. C. Thompson
G. W. Hall and
By W. P. Fitzgerald & Co.
Attorneys

UNITED STATES PATENT OFFICE.

JUELL C. THOMPSON AND GEORGE W. HALL, OF BRAINERD, MINNESOTA.

LUBRICATING DEVICE FOR CAR-AXLES.

1,065,641.

Specification of Letters Patent.

Patented June 24, 1913.

Application filed August 7, 1912. Serial No. 713,889.

*To all whom it may concern:*

Be it known that we, JUELL C. THOMPSON and GEORGE W. HALL, citizens of the United States, residing at Brainerd, in the county of Crow Wing and State of Minnesota, have invented certain new and useful Improvements in Lubricating Devices for Car-Axles; and we do hereby declare the following to be a full, clear, and exact description of the invention, such as will enable others skilled in the art to which it appertains to make and use the same.

Our invention relates to new and useful improvements in lubricating devices for car axles.

The prime object of our invention is to provide a reservoir for oil or other lubricant and mechanism controlled by the rotation of the axle for supplying the lubricant in small quantities to the axle.

A further object of our invention is to provide an axle having a loose wheel and to supply lubricant thereto during rotation of the axle.

Other objects and advantages of our invention will be hereinafter made clearly apparent in the specification and pointed out in the claims.

In the accompanying drawings we have shown the preferred form which our invention may take.

Figure 5:
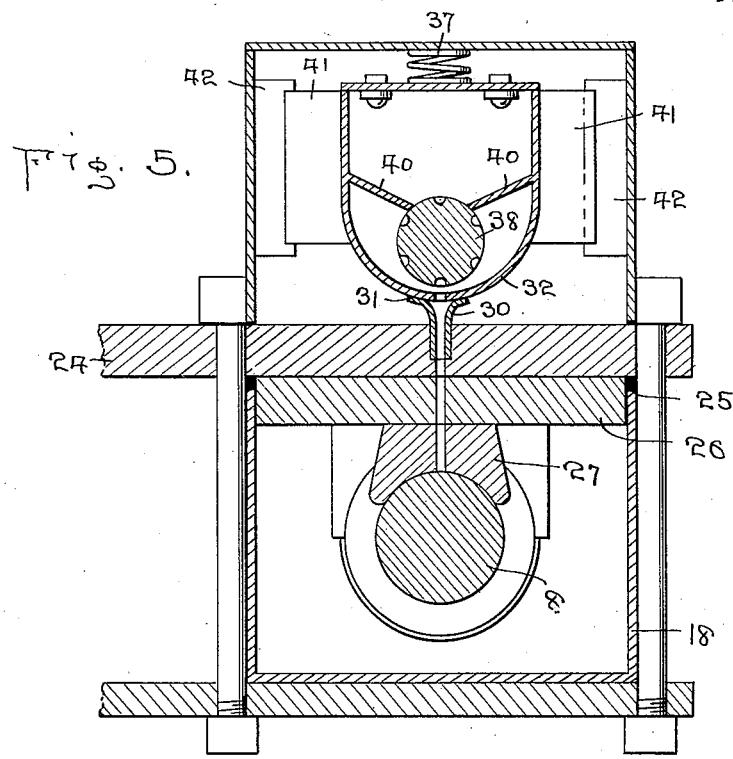
Figure 6:
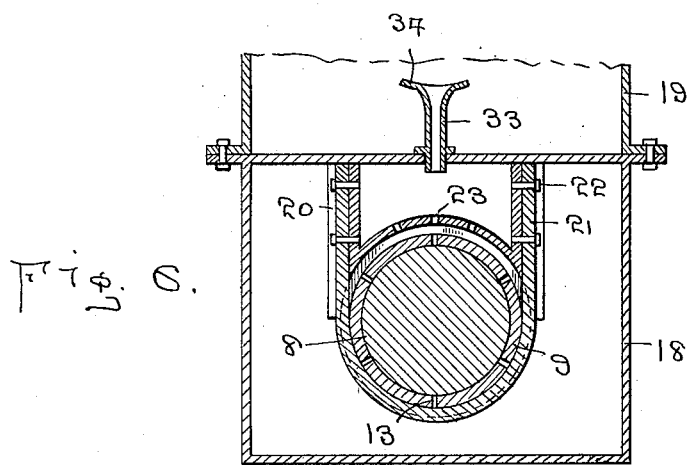

In said drawings, Figure 1 is a vertical sectional view through an axle housing and bearing, and the mechanism employed by us for supplying lubricant thereto. Fig. 2 is a detail view of a portion of the mechanism as seen on line 2—2, Fig. 1. Fig. 3 is a detail sectional view as seen on line 3—3, Fig. 1. Fig. 4 is an elevation of a sleeve employed by us adapted to fit over a portion of the axle. Fig. 5 is a transverse sectional view through an axle housing and lubricating device associated therewith, as seen on line 5—5, Fig. 1, and, Fig. 6 is a transverse sectional view through one end of the device. Fig. 7 is a vertical sectional view of the slightly modified form of bearing for the reduced end of the axle, the same showing the form of roller bearing employed in connection with our lubricating device.

Referring to the drawings by numerals of reference, similar numerals designating corresponding parts throughout the several views, 7 is an axle, which is provided at one end with a rigidly mounted wheel (not shown), the opposite end of the axle being provided with a reduced spindle 8. A sleeve 9 having an enlarged end 10 is placed upon the spindle and is adapted to receive thereon the usual form of car wheel 11. The enlarged end 10 of said sleeve is grooved as seen at 12, and said grooved portion is provided with a plurality of diagonally extending oil ducts 13, which extend from said groove toward the central portion of said sleeve, so that oil supplied to said sleeve in the manner hereinafter set forth will be conducted to the spindle. When the sleeve 9 has been placed upon the spindle it is adapted to be locked against longitudinal movement by means of a nut 14, which is turned upon the threaded portion 15 intermediate the ends of said spindle, and said nut is locked in position in any desired manner, preferably by means of cotter pins 16, which extend through bores formed in said nut, and fit within grooves 17, formed in the sides of the threaded portion 15 of the spindle.

The housing for the spindle end of the axle comprises a box 18 and a cover section 19. The spindle and the enlarged portion 10 of the sleeve extend through an opening in one end of the box 18 and said end of the box has secured thereto an oil reservoir 20, the lower surface of which is curved to fit the contour of the enlarged end 10. The sides of said reservoir have grooves therein adapted to receive the ends of a U-shaped yoke 21, which is formed to fit in the lower portion of the groove 12. The ends of the yoke 21 are secured within the grooves in the sides of the reservoir by means of bolts 22, or in any other desired manner. The bottom wall of the reservoir is provided with a plurality of oil holes 23, which are arranged in alinement with the groove 12 so that oil supplied to said reservoir will flow therefrom through said holes and into the grooves 12 and from thence will flow by way of oil ducts 13 to the spindle.

The upper truck bar 24, which receives the weight of the car and truck frame, has its end extended transversely through openings 25 formed in the side of the box 18 and rests upon a plate 26, which in turn rests upon a bearing block 27 formed of Babbitt metal, or other desired suitable material. The lower truck bar is extended beneath the box 18 and is secured to the upper truck bar 24 in any desired manner, as by means of bolts, as clearly shown in Fig. 5.

The upper wall of the box 18 is cut away transversely, and portions thereof are bent up and engage with the sides of the truck bar 24, so as to prevent relative movement of the box and truck-bar, and one end of said top wall is provided with a transverse slot 28, for a purpose hereinafter made clearly apparent.

The truck bar 24, plate 26 and bearing block 27 are provided with registering channels 29 and a tube 30 having a flared upper end 31 is inserted into the upper portion of the channel 29 in the truck bar 24 and the flared end extends into close engagement with the bottom wall of an oil reservoir 32. An oil tube 33 also extends through the upper wall of the box 18 and into communication with the oil reservoir 20, the flared upper end of said tube also fitting against the bottom wall of the oil receptacle 32. Said receptacle 32 is provided with openings 35 and 36, which register with the tubes 30 and 33, respectively.

The oil receptacle 32 is mounted in the upper portion of the cover section or upper casing-section 19 and is held downwardly against the flared ends of the oil tubes by means of coil springs 37 interposed between the upper walls of said receptacle and chamber. An oil feeding roller 38 is journaled in the end walls of the oil receptacle and is provided with a series of small cup-shaped depressions 39 arranged in alinement with the openings 35 and 36. The oil receptacle is provided with a pair of inwardly extending and downwardly directed flanges 40 which extend into close engagement with the periphery of the roller 38, as clearly shown in Fig. 5.

In order that the oil reservoir may be maintained in upright and central position and in close engagement with the oil tubes 30 and 33, we provide the sides thereof with grooved blocks 41, which receive the edges of guides 42 secured to the sides of a cover 19. The top of the oil receptacle is provided with a filling opening 43 having an upwardly extending flange 44 therearound and is adapted to be normally closed by means of a cover 45 pivotally secured to said top. The casing section 19 is also provided with a filling opening 46, which is adapted to be normally closed by a cover 47, pivotally secured to the casing section and said covers 45 and 47 are connected and may be moved simultaneously by a pin 48, a suitable slot 49 being formed in the cover 19 to allow of the movement of said pin. The covers and their connecting pin are arranged so that the openings 43 and 46 will be uncovered or covered simultaneously.

One of the stub-axles of the roller 38 extends through one end wall of the oil receptacle and has secured thereto a wheel 50, which is of sufficient size to extend through the slot 28 and into engagement with a second wheel 51, secured upon the end of the spindle 8. As shown in the drawings the end of the spindle 8 is reduced and is provided with a pair of ears 52, which fit into seats formed in the side of the disk 51. The reduced end of the spindle is screw threaded and adapted to receive a nut 53 thereon whereby the disk 51 is locked in place.

In Fig. 7 is disclosed a roller bearing comprising a casing 54 having rollers 55 therein for supporting the shaft 8. The upper wall of the casing 54 is provided with a channel 56 which is adapted to register, when the parts are assembled, with the channel 29 through which oil is conducted to the spindle 8 from the oil receptacle 32.

When our invention is employed in use, the upper portion of the oil receptacle 32 is filled with oil and, when the car is in operation and the wheels rotating, the oil feeding roller 38 will also be rotated, through the medium of the wheels 50 and 51, and the depressions 39 will each receive a quantity of oil and carry the same below the partitions 40, whereupon said quantities of oil will drop into the lower portion of the oil receptacle and gravitate through the openings 35 and 36 and by way of the channel 29 and oil tubes 30 and 33, to the spindle of the axle and to the oil reservoir 20, respectively.

In employing our invention upon the spindle of the opposite end of the axle from that shown, we dispense with the sleeve 9, the oil reservoir and the oil duct 33 and provide the bottom of the housing with the desired number of openings arranged in communication with channels extending to the bearing surface of the spindle.

By the construction herein shown it will be seen that the spindle of the axle will be continuously supplied with small quantities of oil and it will also be seen that the oil will be carried to the spindle only when the car is in motion. It will also be seen that the employment of a loose wheel upon the axle will allow the car to easily travel around curves, at which time the sleeve will rotate upon the spindle.

While we have shown the preferred form of our invention we desire to have it understood that certain modifications may be made therein without departing from the spirit and scope of our invention.

What we claim as new is:

1. In combination with a rotatable axle, a peripherally grooved bearing surrounding the axle and adapted to rotate relative thereto and having a series of oil-ducts communicating with the peripheral groove and with the axle and an oil reservoir having an opening in communication with the peripheral groove of the first said bearing, means for supporting the oil reservoir, and a yoke having its medial portion fitted into the peripheral groove under the first said bearing.

2. In combination with an axle and a bearing therefor, a casing above the axle and bearing, a vertically movable oil-receptacle in the casing and having an oil conduit communicating therewith and with the surface of the axle, an oil-feeding member rotatably mounted in the oil-receptacle, a gear wheel for actuating the oil-feeding members, a gear wheel operatively connecting the axle with the first said gear wheel, and resilient means for holding the oil-receptacle down and assisting gravity in retaining the gear wheels in operative relation.

3. In combination with a rotatable axle, a peripherally-grooved bearing surrounding the axle and adapted to rotate relative thereto, a second bearing stationary with relation to the axle and the first said bearing, an oil reservoir, means associated with the second said bearing for supporting the oil reservoir, said reservoir having an opening in communication with the peripheral-groove of the first said bearing, the first said bearing having a series of oil-ducts communicating with the peripheral-groove and with the axle, and a yoke having its medial portion fitted into the peripheral groove under the first said bearing and having its end portions secured to the reservoir.

In testimony whereof we have signed our names to this specification in the presence of two subscribing witnesses.

JUELL C. THOMPSON.
GEORGE W. HALL.

Witnesses:
A. D. JOHNSON,
J. L. ELLIS.

Copies of this patent may be obtained for five cents each, by addressing the "Commissioner of Patents, Washington, D. C."